(12) United States Patent
Lee et al.

(10) Patent No.: US 10,775,240 B2
(45) Date of Patent: Sep. 15, 2020

(54) METHOD FOR EVALUATING SECONDARY BATTERY ACTIVE MATERIAL

(71) Applicant: SK Innovation Co., Ltd., Seoul (KR)

(72) Inventors: Suk-Chin Lee, Daejeon (KR);
Hyo-Sang Kim, Daejeon (KR);
Jung-Hyun Yun, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 19 days.

(21) Appl. No.: 16/099,713

(22) PCT Filed: Mar. 27, 2017

(86) PCT No.: PCT/KR2017/003260
§ 371 (c)(1),
(2) Date: Nov. 8, 2018

(87) PCT Pub. No.: WO2017/195979
PCT Pub. Date: Nov. 16, 2017

(65) Prior Publication Data
US 2019/0186996 A1 Jun. 20, 2019

(30) Foreign Application Priority Data

May 12, 2016 (KR) .......................... 10-2016-0058146

(51) Int. Cl.
*G01J 3/44* (2006.01)
*H01M 4/587* (2010.01)
(Continued)

(52) U.S. Cl.
CPC . *G01J 3/44* (2013.01); *G01J 3/42* (2013.01);
*G01N 21/65* (2013.01); *H01M 4/36* (2013.01);
*H01M 4/366* (2013.01); *H01M 4/587* (2013.01)

(58) Field of Classification Search
CPC .. G01J 3/44; G01J 3/42; G01N 21/65; H04M 4/36; H04M 4/366; H04M 4/587
See application file for complete search history.

(56) References Cited

U.S. PATENT DOCUMENTS 9,698,414 B2    7/2017 Saka et al.
9,972,836 B2 *  5/2018 Yang ................ H01M 10/0525
(Continued)

FOREIGN PATENT DOCUMENTS

CN    101277900 A    10/2008
CN    101589492 A    11/2009
(Continued)

*Primary Examiner* — Dominic J Bologna
(74) *Attorney, Agent, or Firm* — The Webb Law Firm

(57) ABSTRACT

Provided is a method for evaluating a secondary battery active material, comprising: preparing an active material including a core and a shell located on the surface of the core; forming an active material layer including the active material on at least one surface of a current collector; acquiring a Raman spectrum for the active material and calculating a Raman R value ($I_D/I_G$) therefrom; obtaining a frequency distribution chart for the Raman R value; obtaining a probability density function by normalizing the frequency distribution chart; and evaluating the shell of the active material by extracting a Raman R value ($I_D/I_G$) and/or a predetermined width indicating a maximum value from the graph of the probability density function.

11 Claims, 3 Drawing Sheets

(51) Int. Cl.
*G01J 3/42* (2006.01)
*H01M 4/36* (2006.01)
*G01N 21/65* (2006.01)

(56) References Cited

U.S. PATENT DOCUMENTS

| | | | |
|---|---|---|---|
| 9,972,839 B2 | 5/2018 | Song et al. | |
| 2009/0112020 A1 | 4/2009 | Hinago et al. | |
| 2010/0086856 A1 | 4/2010 | Matsumoto et al. | |
| 2011/0182000 A1 | 7/2011 | Gadkaree et al. | |
| 2013/0065138 A1* | 3/2013 | Takahata | H01M 4/133 429/338 |
| 2013/0130121 A1 | 5/2013 | Abe et al. | |
| 2013/0295492 A1 | 11/2013 | Hinago et al. | |
| 2014/0120418 A1* | 5/2014 | Song | H01M 4/48 429/211 |
| 2015/0037240 A1* | 2/2015 | Chen | B01J 37/18 423/447.3 |
| 2015/0066377 A1* | 3/2015 | Parchen | G06K 9/00536 702/19 |
| 2015/0093633 A1* | 4/2015 | Miyabara | H01M 4/366 429/163 |
| 2015/0349329 A1* | 12/2015 | Saka | H01M 4/364 427/58 |
| 2017/0057825 A1 | 3/2017 | Suzuki et al. | |

FOREIGN PATENT DOCUMENTS

| | | |
|---|---|---|
| CN | 101641810 A | 2/2010 |
| CN | 102741959 A | 10/2012 |
| CN | 103069625 A | 4/2013 |
| JP | 2009229714 A | 10/2009 |
| KR | 1020130126273 A | 11/2013 |
| KR | 1020140052756 A | 5/2014 |
| KR | 1020150137451 A | 12/2015 |
| KR | 1020150138084 A | 12/2015 |
| WO | 2011145177 A1 | 11/2011 |
| WO | 2015133366 A1 | 9/2015 |

* cited by examiner

METHOD FOR EVALUATING SECONDARY BATTERY ACTIVE MATERIAL

CROSS-REFERENCE TO RELATED APPLICATIONS

This application is the United States national phase of International Application No. PCT/KR2017/003260 filed Mar. 27, 2017, and claims priority to Korean Patent Application No. 10-2016-0058146 filed May 12, 2016, the disclosures of which are hereby incorporated in their entirety by reference.

BACKGROUND

Technical Field

This application relates to a method of evaluating an active material for a secondary battery.

Related Art

A secondary battery is a battery that can convert chemical energy into electrical energy to provide a power supply to an external circuit, or receive a power supply from an outside to convert electrical energy into chemical energy and store it, and a charging and a discharging are possible, and it can be referred to as a so-called storage battery.

An application field of such a secondary battery is being expanded, for example, recently, it is used as a power supply of a portable electronic product such as a notebook, a computer, and a mobile phone, etc., or it is used as a power supply of a product such as hybrid electric vehicles (HEV), a plug-in hybrid electric vehicle (plug-in HEV), etc.

In general, an active material used in the secondary battery includes, for example, a core-shell particle, and in such a core-shell particle, although a relative size of a shell thickness and a uniformity of a shell thickness acts as an important element that influences on an effect of the secondary battery, it is in a state, in which a method capable of evaluating it, is not provided.

SUMMARY

In one embodiment of this application, a method of evaluating an active material for a secondary battery capable of easily evaluating a relative size of a thickness of a shell and a uniformity of a thickness of a shell included in an active material is provided.

However, the technical problem to be performed by this application is not limited to the above-mentioned problem, and other problems, which are not mentioned, can be clearly understood by those skilled in the art from the following description.

In one embodiment of this application, a method for evaluating an active material for a secondary battery, including: preparing an active material including a core and a shell that is disposed on a surface of the core; forming an active material layer including the active material on at least one surface of the current collector; obtaining a Raman spectrum for the active material and calculating a Raman R value $(I_D/I_G)$ therefrom; obtaining a frequency distribution graph of the Raman R value; performing a normalization with regard to the frequency distribution graph to obtain a probability density function; and evaluating a shell of the active material by extracting a Raman R value $(I_D/I_G)$ that shows a maximum value, a predetermined width, or both of them from a graph of the probability density function.

There is an advantage capable of easily evaluating the relative size of the thickness of the shell and the uniformity of the thickness of the shell included in the active material by the evaluation method.

Accordingly, it is possible not only to select the active material that satisfies the predetermined requirement required with regard to the thickness of the shell included in the active material in advance, but also to continuously and evenly implement the performance of the secondary battery.

It is possible to evaluate the shell of the active material by using the Raman R value $(I_D/I_G)$ that indicates the maximum value as an index that indicates a relative size of a thickness of the shell included in the active material, or using the predetermined width as an index that indicates a relative uniformity of the thickness of the shell included in the active material, or using both of them.

In the step of calculating the Raman R value $(I_D/I_G)$, the Raman spectrum of the active material may be obtained by performing the Raman spectroscopy with regard to the active material layer.

In the evaluation method, it is possible to minimize the deviation that can be generated according to a laser focusing of the Raman spectroscope at the predetermined measurement position by forming the active material layer that includes the active material and performing the Raman spectroscopy with regard to the active material layer.

It is possible to easily evaluate a relative size of a thickness of a shell and a uniformity of a thickness of a shell included in an active material by using a method of evaluating an active material for a secondary battery.

DETAILED DESCRIPTION

In the present specification, when a predetermined embodiment and/or a predetermined component included therein "comprises" any component, unless there is an opposed description particularly, it may mean that it does not exclude another component and it can further include another component.

In the present specification, any configuration being formed or disposed in an upper portion (or a lower portion) of a substrate or on (or under) a substrate may also mean that any configuration is formed or disposed in contact with the upper surface (or the lower surface) of the substrate, and is not limited to including another configuration between any configuration formed on (or under) the substrate or the substrate.

"A step (of) ~" or "a step of ~", which is a term in a degree used in the present specification, does not mean "a step for ~".

As a term in a degree used in the present specification, "about", and "substantially", etc., are used as a meaning in the numerical value thereof or close to the numerical value thereof when a unique production and a material allowable error are suggested to the mentioned meaning, and they can be used to prevent a disclosure that a correct or absolute numerical value is mentioned in order to help the understanding of this application from being unfairly used by an unconscientious infringer. Hereinafter, the embodiments of this application will be described in detail with reference to the accompanying drawings so that those skilled in the art to which this application pertains can easily perform this application. However, this application can be implemented in many different forms and the embodiments described below are to merely illustrate or describe this application, and is not limited to the embodiment described herein.

Figure 1:
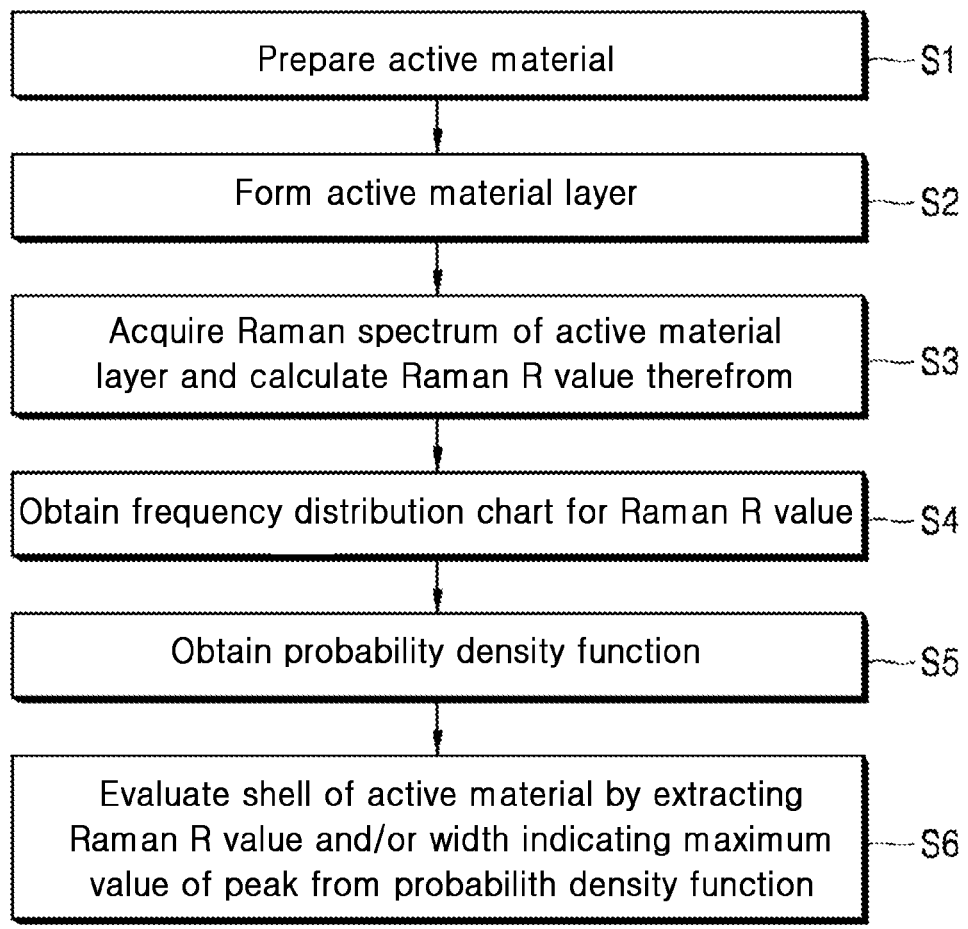
FIG. 1 is a schematic process flow diagram of a method for evaluating an active material for a secondary battery in accordance with an exemplary embodiment of this application.

FIG. 1 schematically shows a process flow diagram of a method for evaluating an active material for a secondary battery in accordance with an exemplary embodiment of this application.

In one embodiment of this application, there is provided a method for evaluating an active material for a secondary battery, including: preparing an active material including a core and a shell that is disposed on a surface of the core (S1); forming an active material layer including the active material on at least one surface of a current collector (S2); obtaining a Raman spectrum for the active material layer and calculating a Raman R value ($I_D/I_G$) therefrom (S3); obtaining a frequency distribution graph for the Raman R value (S4); performing a normalization with regard to the frequency distribution graph to obtain a probability density function (S5); and evaluating a shell of the active material by extracting a Raman R value ($I_D/I_G$) that indicates a maximum value, a predetermined width, or both of them from a graph of the probability density function (S6).

The active material used for the electrode production for the secondary battery may include a core-shell particle that includes a core and a shell disposed on the surface of the core, and the shell may be a layer coated on the surface of the core, and may be referred to as a so-called coating layer.

Although the shell of the core-shell particle, i.e., a property of the thickness of the coating layer, for example, a relative size of the thickness and a uniformity of the thickness is an important element that influences on a performance of the secondary battery, a method capable of evaluating it did not exist conventionally.

Due to the above, it may have no choice but to produce the secondary battery by using it without selecting the core-shell particle in advance according to the property with regard to the above-mentioned thickness, and thus, it is in a state that it is difficult to continuously and evenly implement the performance of the secondary battery.

In addition, when it is desired to classify the core-shell particle that satisfies a predetermined property with regard to the thickness of the shell, there is an inefficient problem to classify it through a process of firstly producing the secondary battery, etc., by using it, and then, inversely analyzing the result obtained by measuring the performance thereof.

Thus, in one embodiment of this application, there is an advantage that it is possible to easily evaluate the relative size of the thickness of the shell and the uniformity of the thickness of the shell included in the active material by the evaluation method, and accordingly, it is possible not only to select the active material in advance that satisfies a predetermined requirement that is required with regard to the thickness of the shell included in the active material, but also to continuously and evenly implement the performance of the secondary battery.

In the above evaluation method, it is possible to prepare the active material including the core and the shell disposed on the surface of the core.

The active material may be specifically a core-shell particle.

In the step of preparing the active material, it is possible to prepare the active material so that the core includes crystalline carbon, and the shell may include amorphous carbon.

The core may include the crystalline carbon, as mentioned above, and the crystalline carbon may include, for example, natural graphite, artificial graphite, or both of them, but is not limited thereto.

Since the natural graphite has a plate type shape and has a large surface area, and an edge surface is exposed as it is, and a penetration or a decomposition reaction of an electrolyte may occur when applied to an anode active material, and for example, it is possible to use it by forming it in a spherical shape through a post processing such as a spherizing process, etc.

An average particle size (D50) of the core particle may be, for example, about 7 μm to about 30 μm, but is not limited thereto. The average particle size (D50) may mean a diameter of a particle in which a cumulative volume corresponds to 50 vol % in the particle size distribution.

The shell may include the amorphous carbon, as described above, and the amorphous carbon may include, for example, soft carbon, hard carbon, or both of them.

The soft carbon may include at least one selected from the group consisting of coal-based pitch, petroleum-based pitch, polyvinylchloride, mesophase pitch, tar, low molecular weight heavy oil and a combination thereof, but is not limited thereto.

The hard carbon may include at least one selected from the group consisting of, for example, citric acid, stearic acid, sucrose, polyvinylidene fluoride, carboxymethylcellulose, hydroxypropylcellulose, regenerated cellulose, polyvinylpyrrolidone, polyethylene, polypropylene, ethylene-propylene-diene monomer (EPDM), polyacrylic acid, polyacrylonitrile, glucose, gelatin, phenol resin, naphthalene resin, polyamide resin, furan resin, polyvinyl alcohol resin, polyimide resin, cellulose resin, styrene resin, epoxy resin and a combination thereof, but is not limited thereto.

The average thickness of the shell may be, for example, about 5 nm to about 100 nm, but is not limited thereto.

Further, the active material may be, for example, the anode active material.

In the above evaluation method, it is possible to form the active material layer including the active material on at least one surface of the current collector.

The current collector may be, for example, the anode current collector, and may also include at least one selected from the group consisting of copper, stainless steel, aluminum, nickel, titanium, sintered carbon, aluminum-cadmium alloy, and a combination thereof, but is not limited thereto.

The current collector may have a form of, for example, a film, a sheet, etc., and may also have a thickness of, for example, about 20 μm to about 100 μm, but is not limited thereto.

The active material layer that includes the active material may be formed, for example, by coating and drying a slurry including the active material on one surface or both surfaces of the current collector.

The slurry may include, for example, at least one selected from the group consisting of the above active material, a binder, a solvent, other additives, and a combination thereof, and other additives may include a thickener and a conductive material, but is not limited thereto.

The binder may use a kind known in the art and may include, for example, polyvinylidene fluoride (PVDF), polyvinyl alcohol, starch, hydroxypropylcellulose, regenerated cellulose, polyvinylpyrrolidone, tetrafluoroethylene, polyethylene, polypropylene, ethylene-propylene-diene polymer (EPDM), etc.

The solvent may use a kind known in the art and may include, for example, dimethyl sulfoxide (DMSO), isopropyl alcohol, N-methylpyrrolidone (NMP), and acetone, etc.

A coating of the slurry can be performed by using various methods such as a slot die coating, a slide coating, a curtain coating, a gravure coating, etc., and a drying can be performed by using a dryer known in the art, and is not particularly limited thereto.

The active material layer can be formed, for example, by further performing a rolling process, and for example, it is possible to coat, dry, and roll the slurry, or coat and dry, and roll the slurry.

In the step of forming the active material layer, for example, the active material layer may be formed to have an area of about 10 cm×about 10 cm and a thickness of about 50 µm, but is not limited thereto.

In the above evaluation method, it is possible to obtain the Raman spectrum for the active material and calculate the Raman R value ($I_D/I_G$) therefrom.

In the step of calculating the Raman R value ($I_D/I_G$), the Raman spectrum of the active material may be obtained by performing the Raman spectroscopy with regard to the active material layer.

When the Raman spectroscopy is performed with regard to the active material itself, since the active material has a spherical shape, there is a problem that a deviation may occur significantly due to a laser focusing of the Raman spectroscope at a predetermined measurement position.

Thus, in the above evaluation method, it is possible to minimize the deviation as described in the above by forming the active material layer including the active material and performing the Raman spectroscopy with regard to the active material layer.

The Raman spectroscopy can be performed by using the Raman spectroscope of a kind known in the art, and is not particularly limited thereto.

The Raman spectroscopy can be performed, for example, by selecting a predetermined area on the surface of the active material layer and using a Raman mapping of the Raman spectroscope with regard to the area.

For example, the Raman spectroscopy may randomly specify 100 to 5,000 areas on the surface of the active material layer and may be performed in the above area, and an area of each area may be a size of (30 µm to 50 µm)×(30 µm m to 75 µm).

The Raman mapping can be used by setting a mapping interval to, for example, about 1 µm to about 10 µm with regard to an x-axis and setting a mapping interval to about 1 µm to about 5 µm with regard to a y-axis, but is not limited thereto.

A laser wavelength of the Raman spectroscope can be, for example, about 532 nm to about 785,633 nm, and the laser output can be about 5 mW to about 90 mW, and a laser exposure time can be about 3 seconds to about 20 seconds, and a scan number can be 1 to 5 times.

The Raman R value ($I_D/I_G$) is a ratio of an intensity ($I_D$) of a D band to an intensity ($I_G$) of a G band, and the intensity ($I_G$) of the G band is a peak intensity with regard to a wave-number domain of about 1,540 $cm^{-1}$ to about 1,620 $cm^{-1}$, and the intensity ($I_D$) of the D band may be a peak intensity for a wave-number domain of about 1,300 $cm^{-1}$ to about 1,420 $cm^{-1}$.

The carbon atoms that form the core and the shell included in the active material may exist by having a predetermined bonding structure, and the predetermined bonding structure may include, for example, any one or both of two types of bonding structures, and one of them may be a structure in which each carbon atom has an angle of about 120° with three adjacent carbon atoms on the same surface, that is, a hexagonal type structure by a $sp^2$ bonding, and the other one may be a structure in which each carbon atom is coupled by having an angle of about 109.5° with four adjacent carbon atoms, that is a tetrahedron structure by a $sp^3$ bonding.

The G band is a peak that can be commonly found in s graphite-based material, and it can be shown in a case in which the carbon atoms that form the hexagonal type structure exist, for example, and the D band may be by a symmetric vibration mode and may be a peak that cannot be observed in a perfect lattice structure, and it can be shown in a case in which the hexagonal type structure is not widely developed or there is a defect thereof, for example.

As described above, the core included in the active material may include the crystalline carbon, and the shell may include the amorphous carbon, and the bonding structure of the carbon atoms that exist in the core and the bonding structure of the carbon atoms that exist in the shell may include the structure by the $sp^2$ bonding and a structure by other bondings at a different ratio from each other, and thus, the intensity ($I_G$) of the G band and the intensity ($I_D$) of the D band measured in each of the core and the shell are shown differently.

Accordingly, when the size of the thickness of the sell or the uniformity of the thickness of the shell of the active material is changed, the Raman R value ($I_D/I_G$) may be also changed.

In the above evaluation method, it is possible to obtain the frequency distribution graph for the Raman R value.

The frequency distribution graph may be, for example, a histogram, but is not limited thereto.

For example, the frequency distribution graph may be obtained by classifying data on the calculated Raman R value, i.e., the Raman R value, into a predetermined class according to a class interval in an interval of about 0.01 to about 0.02, and then examining a frequency of each class to obtain a frequency distribution table that indicates a distribution state thereof, and graphically representing the frequency distribution table, but is not limited to thereto.

In the above evaluation method, it is possible to obtain the probability density function by performing the normalization with regard to the frequency distribution graph.

In the step of obtaining the probability density function, it is possible to obtain the probability density function by performing the normalization by using a Kernel Density Estimation (KDE) method.

The KDE may be one of the non-parametric density estimation methods that perform a normalization by using a predetermined kernel function, and a kernel function may be a non-negative function that is symmetric based on a center and an integral value is 1.

As the kernel function, there are a Gaussian function, an Epanechnikov function, and a Uniform function, etc., but it is not limited thereto.

The normalization can be performed by a Gaussian fitting according to the following functional formula 1:

$$y = a_0 \exp\left[-\ln(2)\left(\frac{x-a_1}{a_2}\right)^2\right] \quad \text{[Functional formula 1]}$$

In the above functional formula, x means a Raman R value ($I_D/I_G$) which is a ratio of an intensity ($I_D$) of a D band to an intensity ($I_G$) of a G band, and $a_0$ is an amplitude, specifically, an amplitude factor, and $a_1$ means a Raman R value ($I_D/I_G$) that indicates a maximum value of the graph according to the functional formula, and $a_2$ means a full width at half max (FWHM) of the graph.

The probability density function may be, for example, the Gaussian function.

In the above evaluation method, by extracting the Raman R value ($I_D/I_G$) that indicates the maximum value, the predetermined width, or both of them from the graph of the probability density function to evaluate the shell of the active material, and specifically, it is possible to evaluate the property with regard to the thickness of the shell.

The maximum value means the maximum value of the graph of the probability density function, and the Raman R value that indicates the maximum value may be a Raman R value corresponding to a center value of the probability density function.

The predetermined width may mean the same vertical axis height, i.e., the width at the same y value, and for example, it can be evaluated by comparing a width.

The predetermined width may be, for example, FWHM, but is not limited thereto.

It is possible to evaluate the shell of the active material by using the Raman R value ($I_D/I_G$) that indicates the maximum value as an index that indicates the relative size of the thickness of the shell included in the active material, or by using the predetermined width as an index that indicates the relative uniformity of the thickness of the shell included in the active material, or by using both of them. It cannot obtain an absolute size value, or an absolute uniformity, for example, a roughness value of the shell thickness from the Raman R value ($I_D/I_G$) that indicates the maximum value.

The size of the thickness is a thick degree and may mean a width between a surface and an opposite surface parallel to the surface, i.e., a numerical value of a thickness, and a uniformity of a thickness may mean a uniform degree in thickness, for example, a rough degree of a shell surface.

For example, in the case of evaluating the active materials having different size of the shell thickness from each other, respectively, it is possible to evaluate the relative size of the thickness of each shell included in each active material by comparing the Raman R values ($I_D/I_G$) that indicate a maximum value extracted according to the above-mentioned evaluation method to each other, and at this time, it is possible to evaluate that the size of the shell thickness is much smaller as the Raman R value ($I_D/I_G$) that indicates the maximum value is smaller, and the size of the shell thickness is much larger as the Raman R value is larger.

On the other hand, when evaluating the active material having different uniformity or the roughness of the shell thickness from each other, respectively, it is possible to evaluate the relative uniformity or the relative roughness of the thickness of each shell included in each active material by comparing the predetermined width extracted according to the above-mentioned evaluation method, and at this time, it is possible to evaluate that the uniformity of the shell thickness is much superior or the roughness is much lower as the predetermined width is narrower, and the uniformity of the shell thickness is much inferior or the roughness is much higher as the width of the peak is wider.

In one embodiment, when the active material includes two or more core-shell particles in which the size of the shell thickness and the uniformity of the shell thickness or both of them are different, the probability density function included with two or more peaks, i.e., the graph of the probability density function that two or more peaks exist can be obtained.

As described above, when two or more peaks exist, it is possible to separately extract the Raman R value ($I_D/I_G$) that indicates the maximum value thereof, the predetermined width, or both of them from each peak.

Accordingly, as described above, even when the active material includes two or more core-shell particles having different properties with regard to the thickness from each other, it is possible to more easily evaluate the property with regard to each thickness by separately forming the active material layer that includes the core-shell particle, respectively, and forming an active material layer that simultaneously includes two or more core shell particles, without the need to perform the evaluation method separately with regard to each active material layer, and performing the evaluation method once with regard to it.

For example, when the active material includes two core-shell particles having different size of the shell thicknesses but the same uniformity, the probability density function in which two peaks exist can be obtained, and in two peaks, the Raman R value that indicates the maximum value may be different; however, the constant y value, i.e., the width in the constant height may be the same.

Further, for example, when the active material includes two core-shell particles that the uniformity of the shell thickness is different, but the size is the same, the probability density function that two peaks exist can be obtained, and in two peaks, both the constant y value, i.e., the width in the constant height can be different, but the Raman R value that indicates the maximum value can be same.

Further, for example, even when the active material comprise two core-shell particles having different both the size of the shell thickness and the uniformity of the shell thickness, a probability density function in which two peaks exist can be obtained, and in two peaks, both a constant y value, that is, a width at a constant height and the Raman R value that indicates the maximum value may be different.

As described above, the evaluation method is a method for evaluating an active material for a secondary battery, specifically, an active material for a lithium secondary battery, which has an advantage of easily evaluating the relative size of the thickness of the shell and the relative uniformity of the thickness of the shell included in the active material even when not subjecting to a cumbersome and inefficient process that evaluates the performance of the secondary battery after manufacturing the secondary battery by including an anode formed by using the active material.

As a result, it is possible to select the active material that satisfies the requirement with regard to the required predetermined thickness, and as well as to produce the secondary battery by using the selected active material, thereby continuously implementing the performance of the secondary battery at an even level.

Hereinafter, specific embodiments of this application will be described. However, the embodiments described below are only intended to specifically illustrate or explain this application, and this application has not to be limited thereto.

EXAMPLE

Example 1

Spherical natural graphite having an average particle size ($D_{50}$) of 16 μm and solid type binder pitch having a softening point of 250° C. were mixed at a weight ratio of 100:10 and mechanically mixed at 2200 rpm for 10 minutes in a high speed agitator to prepare a mixture, and then, by heating the mixture in an electric furnace from 25° C. to 1100° C. over 2 hours and maintaining it at 1100° C. for 1 hour to perform a sintering, thereby forming a shell on a surface of the core to prepare an anode active material as a core-shell particle.

Then, after mixing the prepared anode active material, styrene butadiene rubber (SBR), and carboxymethylcellulose (CMC) as a thickener in a mass ratio of 97.8:1.2:1.0, it was dispersed in a distilled water from which an ion is removed to prepare a composition, and the composition was coated, dried, and rolled on a surface of Cu-foil current collector to form an anode active material layer in a size of 10 cm×10 cm×50 μm to produce an anode of an electrode density of 1.50±0.05 g/cm³.

The Raman spectroscopy by an imaging method was performed 3000 times for the anode active material by using a Raman spectroscope (Renishaw, inVia) to obtain a Raman spectrum.

Specifically, a laser wavelength of the Raman spectroscope was, for example, about 532 nm, a laser output was 12 mW, a scan number was once, and a laser exposure time was 10 seconds, and a mapping interval was set to about 5.0 μm for an x axis and 1.3 μm for a y axis.

Figure 2:
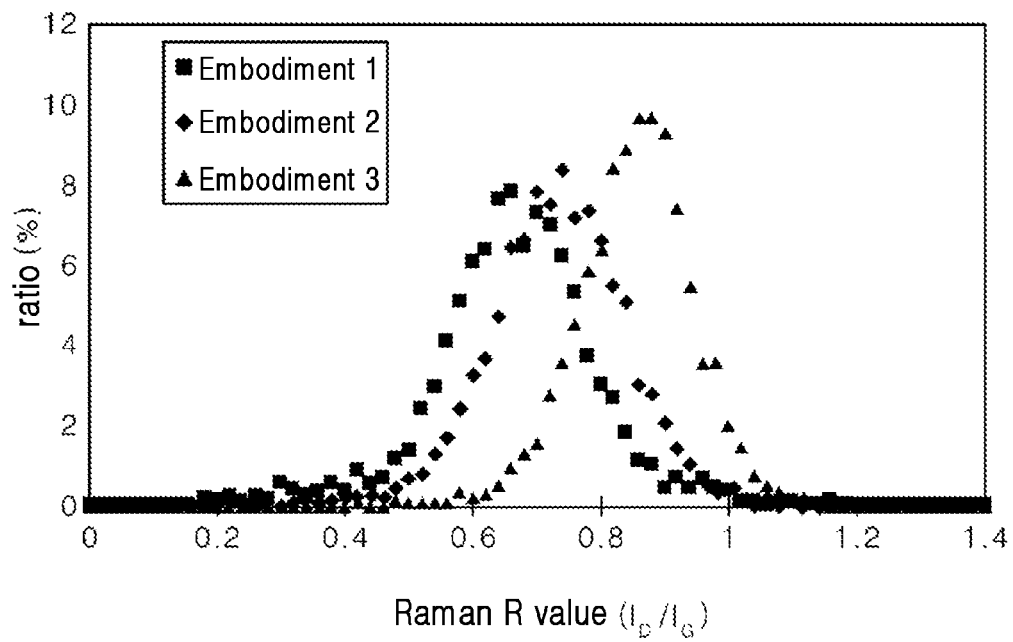
FIG. 2 is a frequency distribution graph for a Raman R value $(I_D/I_G)$ obtained from an evaluation method in accordance with Embodiments 1 to 3 of this application.

Then, the Raman R value was calculated from the Raman spectrum, and a frequency distribution diagram with regard to it was obtained as in FIG. 2.

Figure 3:
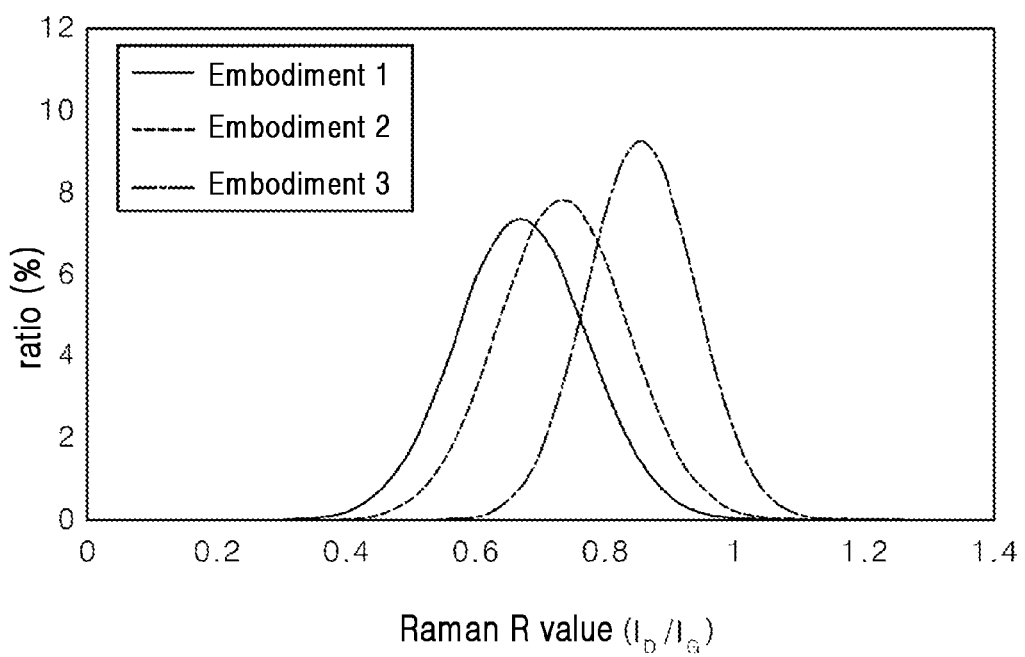
FIG. 3 is a probability density function obtained from an evaluation method in accordance with Embodiments 1 to 3 of this application.
Figure 4:
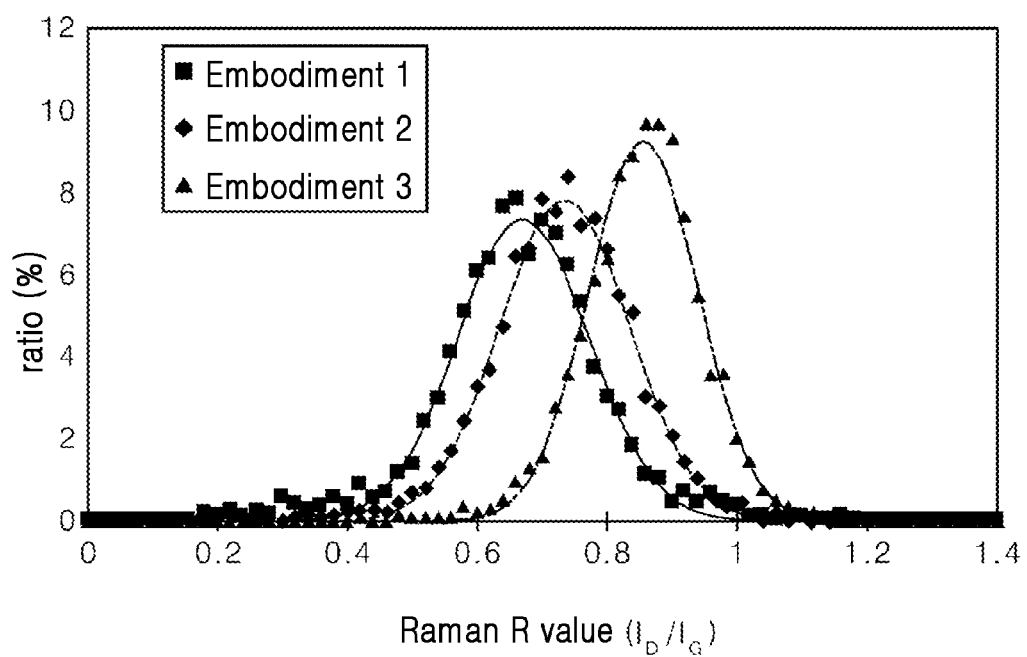
FIG. 4 is a graph showing the frequency distribution graph and the probability density function together obtained from an evaluation method in accordance with Embodiments 1 to 3 of this application.

Further, then, a normalization was performed on the frequency distribution graph by a Gaussian fitting according to following functional formula 1 to obtain a probability density function as in FIG. 3:

$$y = a_0 \exp\left[-\ln(2)\left(\frac{x-a_1}{a_2}\right)^2\right] \quad \text{[Functional formula 1]}$$

Finally, a shell of the active material was evaluated by extracting a Raman R value ($I_D/I_G$) that indicates a maximum value and a predetermined width, specifically, FWHM from the graph of the probability density function, and it is shown in Table 1 below.

Example 2

A shell of an active material was evaluated in the same condition and method as in Example 1, except that spherical natural graphite having an average particle size ($D_{50}$) of 16 μm and a solid type binder pitch having a softening point of 250° C. were mixed at a weight ratio of 100:15 to prepare a mixture.

Example 3

A shell of an active material was evaluated in the same condition and method as in Example 1, except that liquid binder pitch of a softening point of 250° C. was used instead of solid type binder pitch of a softening point of 250° C. to prepare a mixture.

TABLE 1

|  | Raman R value ($I_D/I_G$) that indicates the maximum value | full width at half max (FWHM) |
|---|---|---|
| Embodiment 1 | 0.67 | 0.24 |
| Embodiment 2 | 0.73 | 0.24 |
| Embodiment 3 | 0.86 | 0.20 |

As shown in Table 1 and FIGS. 1 to 3 obtained by using an evaluation method according to Examples 1 to 3, it could be easily confirmed that a size of a thickness of a shell of each active material was increased in an order of Example 1 (0.67)<Example 2 (0.73)<Example 3 (0.86), i.e., the shell is much thicker in the above order.

Further, it could be confirmed that Embodiment 1 (0.24) of the uniformity of the thickness of the shell of each active material was the same as Embodiment 2 (0.24), and Embodiment 3 (0.20) was superior compared to Embodiments 1 and 2.

The invention claimed is:

1. A method for evaluating an active material for a secondary battery, comprising:
   preparing an active material comprising a core and a shell that is disposed on a surface of the core;
   forming an active material layer comprising the active material on at least one surface of a current collector;
   obtaining a Raman spectrum for the active material and calculating a Raman R value ($I_D/I_G$) therefrom, wherein the Raman R value is $R = I_D/I_G$, wherein $I_D$ is an intensity of a D band and $I_G$ is an intensity of a G band;
   obtaining a frequency distribution graph with regard to the Raman R value;
   performing a normalization with regard to the frequency distribution graph to obtain a probability density function; and
   evaluating a shell of the active material by extracting the Raman R value that shows a maximum value, a predetermined width, or both of them from a graph of the probability density function.

2. The method for evaluating the active material for the secondary battery of claim 1, further comprising evaluating the shell of the active material by using the Raman R value that indicates the maximum value as an index that indicates a relative size of a thickness of a shell comprised in the active material, or using the predetermined width as an index that indicates a relative uniformity of the shell thickness included in the active material, or using both of them.

3. The method for evaluating the active material for the secondary battery of claim 1, further comprising obtaining the probability density function by performing the normalization by using a Kernel Density Estimation (KDE) method, in the step of obtaining the probability density function.

4. The method for evaluating the active material for the secondary battery of claim 1,
   wherein the normalization is performed by a Gaussian fitting according to following functional formula 1:

$$y = a_0 \exp\left[-\ln(2)\left(\frac{x-a_1}{a_2}\right)^2\right] \quad \text{[Functional formula 1]}$$

wherein x is the Raman R value, and $a_0$ is an amplitude, and $a_1$ means a Raman R value that indicates a maximum value of a graph according to the functional formula, and $a_2$ means a full width at half max (FWHM) of the graph, in the above functional formula.

5. The method for evaluating the active material for the secondary battery of claim 1, wherein the probability density function is a Gaussian function.

6. The method for evaluating the active material for the secondary battery of claim 1, wherein the Raman spectrum with regard to the active material is obtained by performing a Raman spectroscopy with regard to the active material layer.

7. The method for evaluating the active material for the secondary battery of claim 6, wherein the Raman spectroscopy is performed by selecting a predetermined area on the surface of the active material layer and using a Raman mapping of a Raman spectroscope with respect to the area.

8. The method for evaluating the active material for the secondary battery of claim 7, wherein the Raman mapping is used by setting a mapping interval to 1 μm to 10 μm with regard to an x axis and setting a mapping interval to 1 μm to 5 μm with regard to a y axis.

9. The method for evaluating the active material for the secondary battery of claim 1, wherein the Raman R value is a ratio of an intensity ($I_D$) of a D band to an intensity ($I_G$) of a G band, and the intensity ($I_G$) of the G band is a peak intensity to a wave-number domain of 1,500 $cm^{-1}$ to 1,700 $cm^{-1}$, and the intensity ($I_D$) of the D band is a peak intensity for a wave-number domain of 1,300 $cm^{-1}$ to 1,400 $cm^{-1}$.

10. The method for evaluating the active material for the secondary battery of claim 1, further comprising preparing the active material so that the core comprises crystalline carbon and the shell comprises amorphous carbon, in the step of preparing the active material.

11. The method for evaluating the active material for the secondary battery of claim 1, further comprising a probability density function, which two or more peaks are comprised, when the active material comprises two or more core-shell particles in which a size of a shell thickness, a uniformity of a shell thickness, or both of them are different, in the step of obtaining the probability density function.

\* \* \* \* \*